United States Patent [19]
Milender et al.

[11] Patent Number: 5,899,950
[45] Date of Patent: May 4, 1999

[54] SEQUENTIAL COMMAND REPEATER SYSTEM FOR OFF-ROAD VEHICLES

[75] Inventors: Jeffrey S. Milender; Curtis A. Halgrimson, both of Valley City, N. Dak.; Abraham Orbach, Naperville, Ill.; Keith W. Wendte, Lemont, Ill.; George H. Hale, Naperville, Ill.

[73] Assignee: Case Corporation, Racine, Wis.

[21] Appl. No.: 08/888,754

[22] Filed: Jul. 7, 1997

[51] Int. Cl.⁶ .................................................. G06F 17/00
[52] U.S. Cl. .......................... 701/50; 701/35; 318/568.13
[58] Field of Search ................................ 701/50, 35, 59; 414/699, 694; 172/7, 2, 4; 318/567, 568.1, 568.13; 56/10.2 A, 10.5

[56] References Cited

U.S. PATENT DOCUMENTS

| | | | |
|---|---|---|---|
| 3,789,939 | 2/1974 | Geislinger | 180/6.5 |
| 3,846,761 | 11/1974 | Matsuoka et al. | 395/80 |
| 3,909,801 | 9/1975 | Tokura et al. | 364/174 |
| 4,037,742 | 7/1977 | Gustafsson | 414/694 |
| 4,130,873 | 12/1978 | Fioretta et al. | 395/80 |
| 4,201,937 | 5/1980 | Irie | 318/568.11 |
| 4,288,196 | 9/1981 | Sutton, II | 414/699 |
| 4,518,044 | 5/1985 | Wiegardt et al. | 172/7 |
| 4,671,376 | 6/1987 | Ito et al. | 180/249 |
| 4,715,012 | 12/1987 | Mueller, Jr. | 701/50 |
| 5,062,755 | 11/1991 | Lawrence et al. | 414/4 |
| 5,065,326 | 11/1991 | Sahm | 701/50 |
| 5,188,502 | 2/1993 | Tonsor et al. | 414/700 |
| 5,233,525 | 8/1993 | Overmann et al. | 701/55 |
| 5,421,416 | 6/1995 | Orbach et al. | 701/50 |
| 5,455,769 | 10/1995 | Panoushek et al. | 701/50 |
| 5,493,798 | 2/1996 | Rocke et al. | 37/348 |
| 5,505,267 | 4/1996 | Orbach et al. | 701/50 |
| 5,549,185 | 8/1996 | Kale | 192/12 C |
| 5,558,163 | 9/1996 | Hollstein | 172/2 |

*Primary Examiner*—Tan Q. Nguyen
*Attorney, Agent, or Firm*—Foley & Lardner

[57] ABSTRACT

A control system for controlling outputs associated with off-road vehicles is disclosed herein. The outputs are actuated by actuators in response to control signals generated by a control circuit. In a normal mode, the control circuit generates the control signals based upon command signals generated by operator-actuatable command devices, and applies the control signals to the actuators to control the outputs. In a record mode, the control circuit stores a sequence of commands in a memory circuit to record the sequential actuations of the command devices. Then, in a playback mode, the control circuit generates the control signals based upon the recorded command sequence instead of the command signals. Playback can be triggered manually by a playback switch, or automatically based upon the geo-graphic position of the off-road vehicle. The control system can record and playback more than one command sequence. Each sequence step generates a recorded command which can depend upon a recorded event based upon values of a timer, geographic position or feedback signal. In addition, the operator can erase, view and edit the commanded sequences. The operator can also download and upload command sequences.

43 Claims, 10 Drawing Sheets

FIG. 6
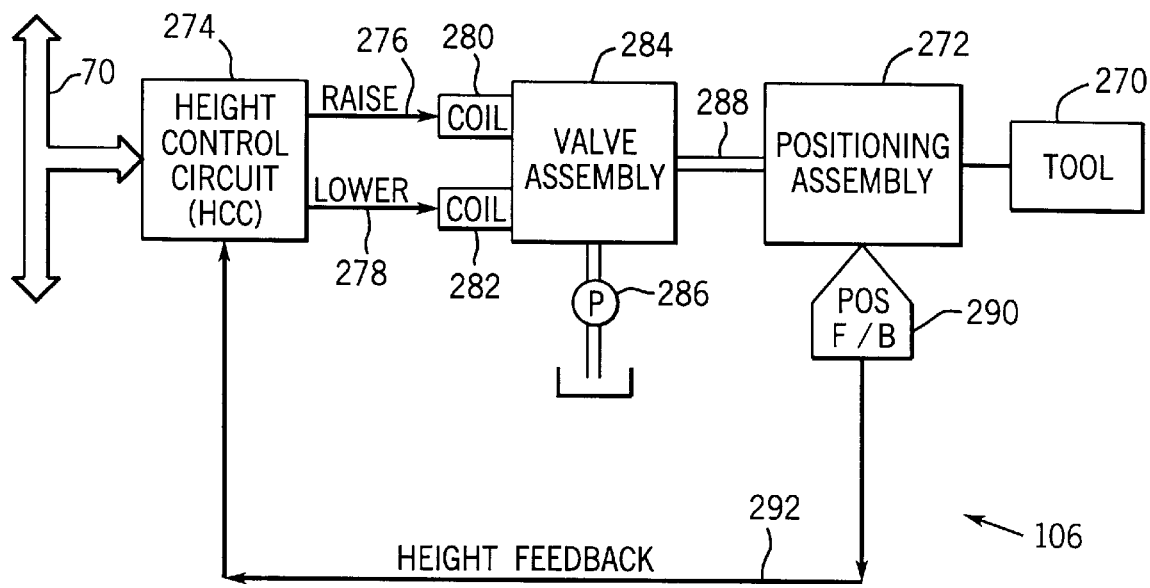
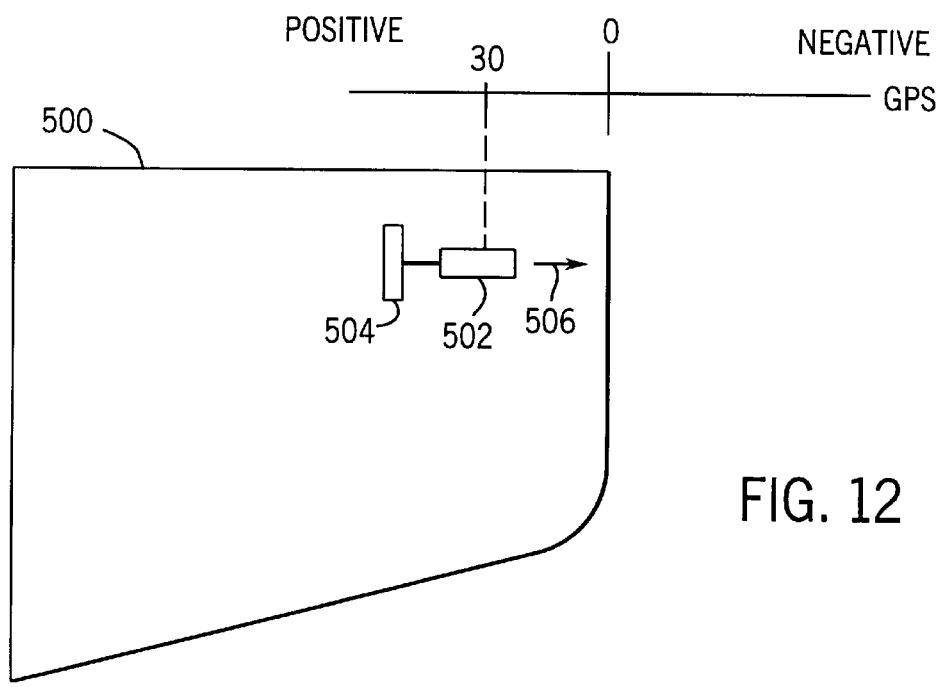
FIG. 12

FIG. 10

COMMAND SEQUENCE DATA STRUCTURE

| SEQUENCE ID | TRIGGER OR PLAYBACK CONDITION(S) | COMMAND DEVICES | SEQUENCE STEPS | RECORDED EVENT | COMMAND |
|---|---|---|---|---|---|
| EXIT_FIELD | EXIT_FIELD_SW OR GPS=30 | HITCH_R/L<br>4WD<br>DL<br>PTO<br>THROTTLE | 1<br>1<br>1<br>1<br>2 | TRIGGER<br>IPOS=TRANS<br>TIMER=1<br>GPS=0<br>IPOS=X<br>IPOS=TRANS | RAISE_HITCH<br>DISENGAGE<br>UNLOCK<br>DISENGAGE<br>90%<br>60% |
| | | U/D_SHIFT | 3 | TIMER=2<br>TIMER=3<br>TIMER=4 | UP_SHIFT TO 5<br>UP_SHIFT TO 6<br>UP_SHIFT TO 7 |
| | | SHIFT_SEL<br>IMP1_R/L<br>IMP1_APPLY<br>IMP2_R/L<br>IMP2_APPLY | 0<br>1<br>1<br>1<br>1 | GPS=-10<br>GPS=-5<br>GPS=-20<br>GPS=-15 | RAISE_IMP1<br>STOP_IMP1<br>RAISE_IMP2<br>STOP_IMP2 |
| ENTER_FIELD | ENTER_FIELD_SW OR GPS=-5 | HITCH_R/L<br>4WD<br>DL<br>PTO<br>THROTTLE | 1<br>1<br>1<br>0<br>2 | TRIGGER<br>IPOS=WORKING<br>TIMER=5<br>IPOS=Y<br>IPOS=WORKING | LOWER_HITCH<br>ENGAGE<br>LOCK<br>60%<br>90% |
| | | U/D_SHIFT | 3 | TIMER=2<br>TIMER=3<br>TIMER=4 | DN_SHIFT TO 6<br>DN_SHIFT TO 5<br>DN_SHIFT TO 4 |
| | | SHIFT_SEL<br>IMP1_R/L<br>IMP1_APPLY<br>IMP2_R/L<br>IMP2_APPLY | 0<br>1<br>1<br>1<br>1 | GPS=10<br>GPS=15<br>GPS=20<br>GPS=25 | LOWER_IMP1<br>START_IMP1<br>LOWER_IMP2<br>START_IMP2 |

SEQUENTIAL COMMAND REPEATER SYSTEM FOR OFF-ROAD VEHICLES

FIELD OF THE INVENTION

The present invention relates generally to control systems for controlling outputs associated with off-road vehicles. In particular, the present invention relates to a sequential command repeater system for controlling outputs associated with an off-road vehicle by repeating a command sequence in response to a triggering condition.

BACKGROUND OF THE INVENTION

Off-road vehicles can include control systems for controlling a plurality of outputs in response to command signals. For example, an off-road vehicle may include systems for controlling a four-wheel drive (4WD) clutch, a differential lock (DL), a power take-off (PTO) clutch, an engine speed actuator, and a transmission. Specific off-road vehicles may include control systems for other outputs. Agricultural tractors, for example, may include control systems for raising and lowering mounted, semi-mounted and trailing implements (e.g., drills, planters, plows, drags, fertilizer spreaders, etc.), and control systems for applying farming inputs using the implements. Mounted implements are coupled to tractors by hitch assemblies (e.g., three-point hitches), and trailing implements are coupled by drawbars. Combines include systems for controlling settings of crop processors such as headers, rotors, concaves, sieves and cleaning fans. Construction vehicles include systems for controlling the settings of construction equipment devices such as booms, arms, buckets and augers.

The command signals applied to off-road vehicle control systems are typically generated by operator-actuatable command devices. Command devices may include discrete (e.g., switches or pulsers) and analog devices (e.g., levers or potentiometers). For example, a DL may be locked, or a 4WD or PTO clutch engaged, based upon actuations of a switch. An engine speed actuator may be controlled based upon positions of a throttle lever. A transmission gear may be selected based upon positions of a shift or pulser lever. An implement may be raised and lowered based upon positions of a position or draft force lever or actuations of a raise/lower switch. A farming input may be applied by an implement based upon settings of a lever which controls a hydraulic valve supplying hydraulic fluid to an actuator on the implement. The command signals on combines and construction vehicles also depend upon command devices. The command signals generated by the command devices may control the outputs directly, or may be combined with other signals by a control circuit and then used to control the output.

Modern off-road vehicles are being equipped with a plurality of control systems for controlling many outputs with increased levels of control. This trend is likely to continue or accelerate with the growing use of digital control systems and data busses. To provide effective control over the increasing numbers of more complex control systems, the cabs of off-road vehicles are being equipped with more operator-actuatable command devices requiring more sequential or concurrent actuations.

The situation wherein a tractor exits a field at the headlands illustrates the many command device actuations required for effective control. For example, it may be desired to perform the following output functions each time a tractor exits a field: raise hitch; disengage 4WD; unlock DL; disengage PTO; lower throttle setting; and shift transmission. Each step may require actuation of a separate command device. The sequence is reversed as the tractor re-enters the field. The sequences repeat each time the tractor exits and re-enters a field. A tractor performs other sequences in other situations, and other types of off-road vehicles perform other sequences.

For effective control, each command sequence step may need to be performed based upon a different event. For example, the operator may have raised the hitch when the tractor was a certain distance from the border of a field, disengaged 4WD after the hitch reached a transport position, unlocked DL one second after starting to raise the hitch, disengaged PTO at the field border, lowered the throttle setting while the implement was raised, and shifted the transmission two, three and four seconds after starting to raise the implement. The operator may have sensed the occurrence of each event and actuated each command device appropriately. Thus, each step may occur in response to an event based upon a geographic position, feedback signal, timer value or other signal.

As the example shows, each command sequence may require actuation of a number of command devices, with each command device actuated once or more than once. Further, effective control may only occur if the correct command devices are actuated in the correct sequence in response to the correct events. Thus, effective control may require a high level of operator skill, training and experience. However, even a skillful operator may not achieve optimal efficiency due to fatigue caused by the high workload needed for effective control. Thus, the efficiencies achievable by off-road vehicles equipped with modern control systems may not be realized due to imprecise command device actuations caused by inadequate operator skill, training or experience, or by fatigue.

Accordingly, it would be advantageous to provide an improved system for controlling outputs associated with off-road vehicles. It would be advantageous to provide a control system for an off-road vehicle which can record a command sequence, and then repeat the recorded sequence. Such a control system could control multiple outputs with each output receiving one or more commands. It would be advantageous to provide a control system for an off-road vehicle which can repeat a plurality of command sequences in response to separate playback signals having either manual or automatic triggers (e.g., geographic position). It would be advantageous if the command sequences could be erased, viewed and edited. Further, it would be advantageous to provide a control system for an off-road vehicle which can repeat a command sequence wherein the steps occur in response to events based upon a geographic position, a feedback signal, a timer value or another signal. It would further be advantageous to download and upload command sequences to external devices.

SUMMARY OF THE INVENTION

An embodiment of the present invention provides a control system for controlling a plurality of outputs associated with an off-road vehicle by recording at least one sequence of commands in response to a record signal and repeating the recorded sequence of commands in response to a playback signal. The outputs are actuated by actuators in response to control signals. The control system includes operator-actuatable command devices configured to generate command signals, a memory circuit and a control circuit coupled to the actuators, the command devices, and the memory circuit. The control circuit is configured to operate in a normal mode wherein the control signals applied to the actuators are generated based upon the command signals, to operate in a record mode in response to the record signal wherein the sequence of commands is recorded in the memory circuit in response to sequential actuations of the command devices, and to operate in a playback mode in response to the playback signal wherein the control signals are generated based upon the recorded sequence of commands. Recorded command sequences can include pairs of recorded events and recorded commands. In the playback mode, the control signals are generated based upon the recorded commands in response to the occurrence of the recorded events. The recorded events can depend upon the values of a timer, a geographic position, or a feedback signal. The control system can include a location signal generation circuit configured to receive positioning signals and to generate location signals therefrom. The trigger for the playback mode can be based upon actuations of a playback switch, or based upon the location signals.

Another embodiment of the present invention provides a control system for controlling a plurality of outputs associated with an off-road vehicle by recording at least one sequence of commands in response to a record signal and repeating the recorded sequence of commands in response to a playback signal. The outputs are actuated by actuator means in response to control signals. The control system includes means for generating command signals, memory means, means for selecting between a record mode, a normal mode and a playback mode in response to the record and playback signals, means for recording the sequence of commands in the memory means in response to sequential command signals when the record mode is selected, means for generating the control signals based upon the command signals when the normal mode is selected and based upon the recorded sequence of commands when the playback mode is selected, and means for applying the control signals to the actuator means.

Another embodiment of the present invention provides a method of controlling a plurality of outputs associated with an off-road vehicle. The outputs are actuated by actuators in response to control signals normally generated in response to actuations of command devices. The method includes the steps of (a) generating a record signal, (b) in response to the record signal, recording a sequence of commands in a memory circuit in response to sequential actuations of the command devices, (c) after the command sequence has been recorded, generating a playback signal, and (d) in response to the playback signal, repeating the sequence of commands by generating control signals based upon the recorded command sequence.

Another embodiment of the present invention provides a control system for controlling a plurality of outputs associated with an off-road vehicle by playback of at least one predetermined sequence of commands in response to a playback signal. The outputs are actuated by respective actuators in response to respective control signals. The control system includes a plurality of operator-actuatable command devices configured to generate command signals, a sequence interface configured to receive the at least one predetermined sequence of commands, and a control circuit coupled to the actuators, the command devices, and the sequence interface. The control circuit is configured to download the at least one predetermined sequence of commands from the sequence interface, and further configured to operate in a normal mode wherein the control signals applied to the actuators are generated based upon the command signals, and to operate in a playback mode in response to the playback signal wherein the control signals are generated based upon the predetermined sequence of commands.

BRIEF DESCRIPTION OF THE DRAWINGS

The invention will become more fully understood from the following detailed description, taken in conjunction with the accompanying drawings, wherein like reference numerals refer to like parts, in which:

FIG. 6 is a block diagram showing the tool height control system of FIG. 3 including a tool height control circuit interfaced to the vehicle data bus, a positioning actuator, and a position feedback sensor;

FIG. 10 shows a table which represents a data structure for recording a sequence of commands;

FIG. 12 shows a map of an agricultural field which includes markers for positions of a tractor and planter, and an arrow showing an expected course of travel.

DETAILED DESCRIPTION OF THE PREFERRED EMBODIMENTS

Figure 1:
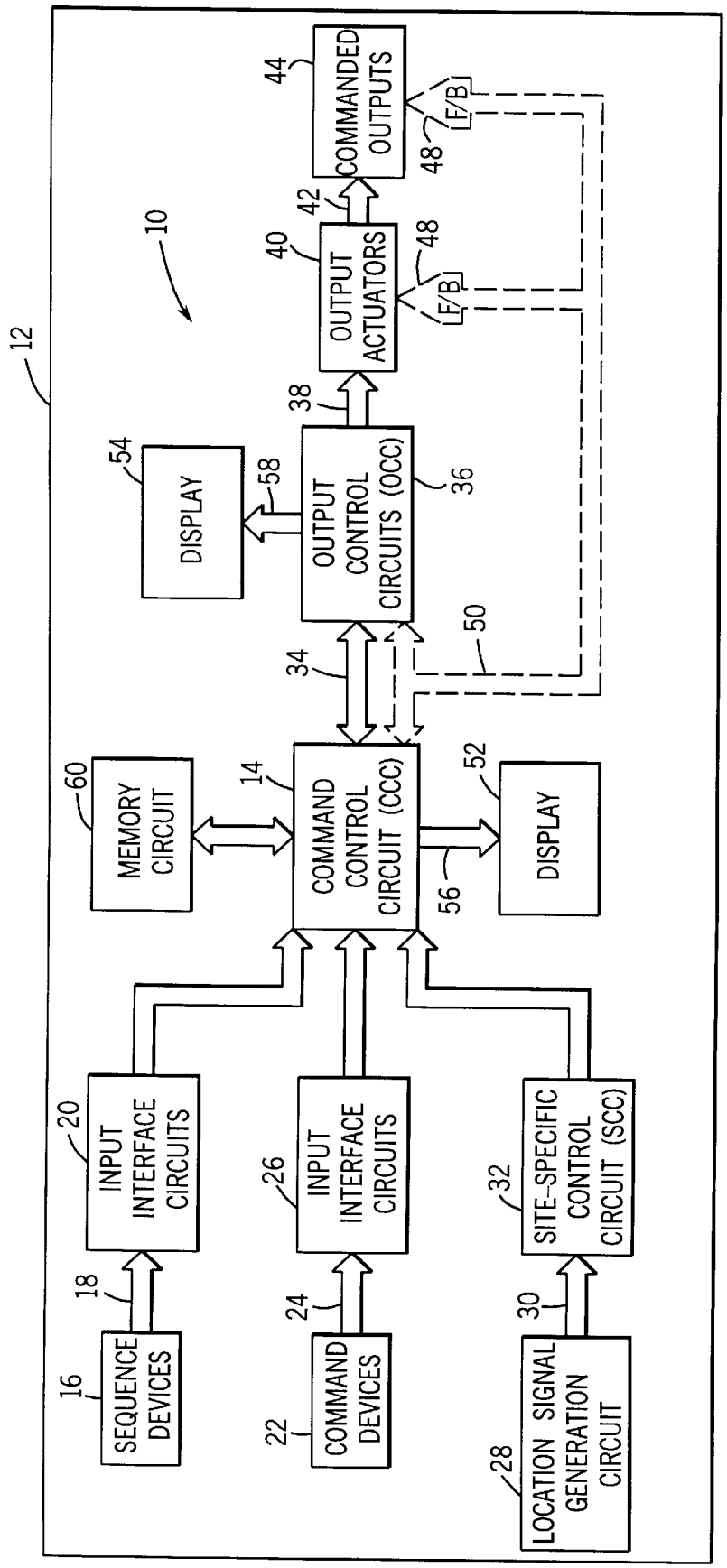
FIG. 1 is a block diagram showing a sequential command repeater system for an off-road vehicle capable of recording and playing back command sequences.

Referring to FIG. 1, a control system 10 for controlling outputs associated with an off-road vehicle 12 can record sequences of commands and then repeat the recorded command sequences. A command control circuit (CCC) 14 receives input signals from three sets of input devices. First, sequence devices 16 generate sequence signals 18 (e.g., record, playback and erase) interfaced to CCC 14 via an input interface circuit 20. Second, command devices 22 generate command signals 24 interfaced to CCC 14 via an input interface circuit 26 (or circuit 20). Command signals 24 are normally used for control purposes. Third, location signal generation circuit 28 generates location signals 30 from positioning signals, and applies signals 30 to a site-specific control circuit (SCC) 32 coupled to CCC 14. Signals 30 represent vehicle positions and, after applying offsets, the locations of implements (not shown) coupled to vehicle 12.

CCC 14 generates intermediate control signals 34 from the input signals and applies them to output control circuits (OCCs) 36. These control signals are converted into control signals 38 which cause the output actuators 40 to actuate commanded outputs 44 via data busses 42. Outputs 44 may be supported by vehicle 12 or implements coupled to vehicle 12. OCCs 36 control outputs 44 in open or closed control loops. For closed loop control, sensors 48 generate feedback signals 50 applied to OCC 36 and, possibly, CCC 14. Sensors 48 may be coupled to actuators 40 or outputs 44. Status or feedback signals may also be provided by OCCs 36 to CCC 14 via a data bus (e.g., data bus 70 in FIG. 2).

In a normal mode of operation, CCC 14 reads command signals 24 and location signals 30 and, based upon these input signals, generates intermediate control signals 34 and applies these signals to OCCs 36. OCCs 36 respond by controlling outputs 44 in an open or closed-loop. Status may be provided to an operator using displays 52 and 54 coupled to CCC 14 and OCC 36 via busses 56 and 58.

In response to a record signal, CCC 14 enters a record mode wherein control of outputs 44 is as described above. CCC 14 further records sequential or concurrent actuations of command devices 22, and positioning signals generated by location signal generation circuit 28. In response to a stop record signal, CCC 14 stops recording actuations of command devices 22, stores the recorded sequence of commands in a memory circuit 60, and returns to the normal mode of operation.

In response to a playback signal, CCC 14 enters a playback mode wherein CCC 14 calculates intermediate control signals 34 based upon a recorded sequence of commands read from memory circuit 60 instead of the current settings of command devices 22. As in normal mode, OCCs 36 use intermediate control signals 34 to control outputs 44 in open or closed loops. Thus, the recorded sequence of commands is repeated. When playback is complete, CCC 14 returns to normal mode of operation.

In response to an erase signal, CCC 14 erases a recorded command sequence from memory circuit 60. Any attempt to playback the erased sequence before a new sequence is recorded will be unsuccessful, and may cause CCC 14 to display an error message on display 52.

In response to a view signal, CCC 14 produces a signal on bus 56 to cause a recorded command sequence to be displayed to an operator (in text or graphics). Then, in response to edit signals, CCC 14 allows the operator to edit the recorded command sequence. Thus, an operator may make adjustments to optimize the command sequence.

FIG. 1 is a functional representation of control system 10, and different physical implementations can be used. For example, although FIG. 1 represents CCC 14 and OCCs 36 as separate circuits which communicate across a bus, their functions may be combined into one control circuit. Also, OCCs 36 can include one or more control circuits, each controlling one or more outputs 44. In addition, although FIG. 1 shows command devices 22 on the input side of CCC 14, one or more command devices 22 may be read by OCCs 36 with their status communicated to CCC 14 via a bus. Similarly, CCC 14 can read feedback signals 50 directly or indirectly via OCCs 36 and a bus.

Figure 2:
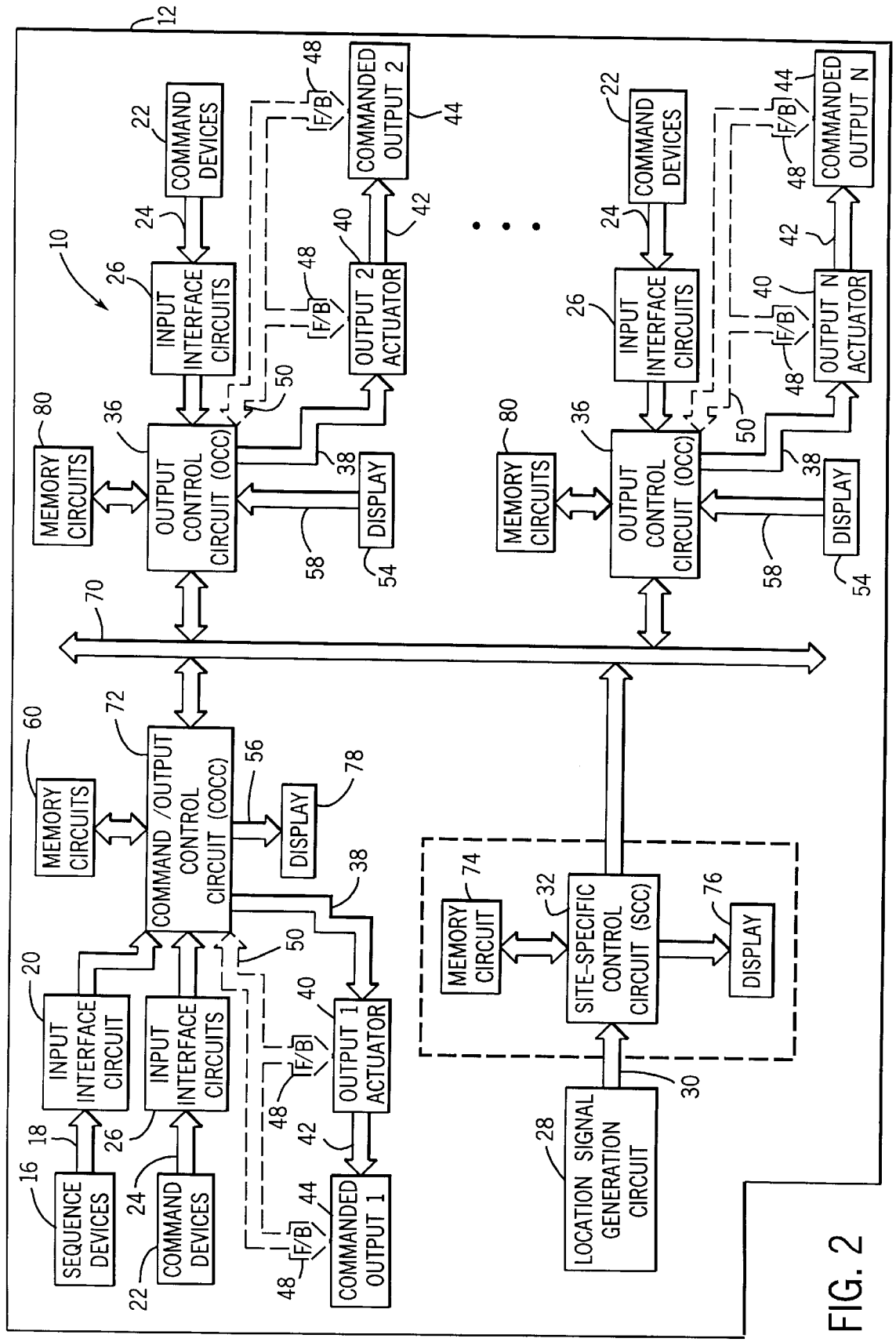
FIG. 2 is a block diagram showing an off-road vehicle equipped with N control systems in communication with each other across a vehicle data bus, wherein one of the N control systems includes an operator interface for a sequential command repeater system such as in FIG. 1.

Referring to FIG. 2, an embodiment of control system 10 shows vehicle 12 equipped with N output control systems for controlling N outputs 44. A command/output control circuit (COCC) 72 performs functions of CCC 14 and, for output 1, of OCC 36. COCC 72 receives sequence signals 18 from sequence devices 16, command signals 24 for output 1 from command devices 22 and location signals 30 from SCC 32 via a vehicle data bus 70. SCC 32 is also coupled to a memory circuit 74 and a display 76. Control signals 38 for output 1 are generated by COCC 72 and are applied to output actuator 40 to actuate first output 44. If configured for closed-loop control, COCC 72 receives feedback signals 50 from feedback sensors 48 coupled to first output actuator 40 or first output 44. A display 78 performs the functions of displays 52 and 54.

Outputs 2 through N are controlled by respective OCCs 36 which communicate with COCC 72 via bus 70. Bus 70 passes global parameters (e.g., control, feedback and status) between COCC 72, SCC 32, and respective OCCs 36. Respective OCCs 36 also read local command signals 24 for respective outputs 44 from command devices 22. Second through Nth control signals 38 are generated by OCCs 36 and are applied to actuators 40 to actuate local outputs 44. If configured for closed-loop control, OCCs 36 also receive feedback signals 50 from feedback sensors 48 coupled to respective output actuators 40 or outputs 44. OCCs 36 can be coupled to their own memory circuits 80.

The operation of the embodiment shown in FIG. 2 is similar to the operation described above in relation to FIG. 1, with several differences. For example, COCC 72 performs the functions of CCC 14 and, for output 1, OCC 36. Also, COCC 72 and OCCs 36 can receive local and/or global command signals from local and/or global command devices 22 (i.e., command signals can be read directly or from bus 70). For example, OCC 36 for output N could receive local command signals from command devices 22 for output N and global command signals from command devices 22 for output 1. Also, SCC 32 can access geo-referenced maps stored in memory circuit 74. These maps include spatially-variable data indicating field borders or other positions in an agricultural or construction field. The distances that vehicle 12 must travel to exit or enter a field are determined by comparing location signals 30 to map data, and are communicated to COCC 72 via bus 70.

The performance of the sequential command repeater functions for the embodiment of FIG. 2 is also similar to the performance described above in relation to FIG. 1. The erase, view and edit functions are performed by COCC 72 in the same manner as CCC 14. To allow COCC 72 to record a command sequence during the record mode, OCCs 36 transmit data via bus 70 which represent actuations of any local command device 22 needed for recording. Then, during record mode, COCC 72 can record all required data.

Performance of the playback function, however, may be different for the embodiments of FIGS. 1 and 2. In FIG. 1, CCC 14 controls playback by generating control signals 34 based upon settings of command devices 22 when playback is inactive and based upon a recorded sequence when playback is active. OCCs 36 then generate control signals 38 based upon intermediate control signals 34, regardless of the playback status. In FIG. 2, for any outputs 44 which may be part of the playback sequence, OCCs 36 may need to generate respective control signals 38 based upon settings of local command devices 22 when playback is inactive, or based upon the recorded command signals from bus 70 when playback is active. To allow OCCs 36 to select the correct command signals, COCC 72 transmits the playback status via bus 70. Then, for any output 44 controlled by the repeater function, OCCs 36 select recorded command sequence data when playback is active, and select local command signals 24 otherwise.

Figure 3:
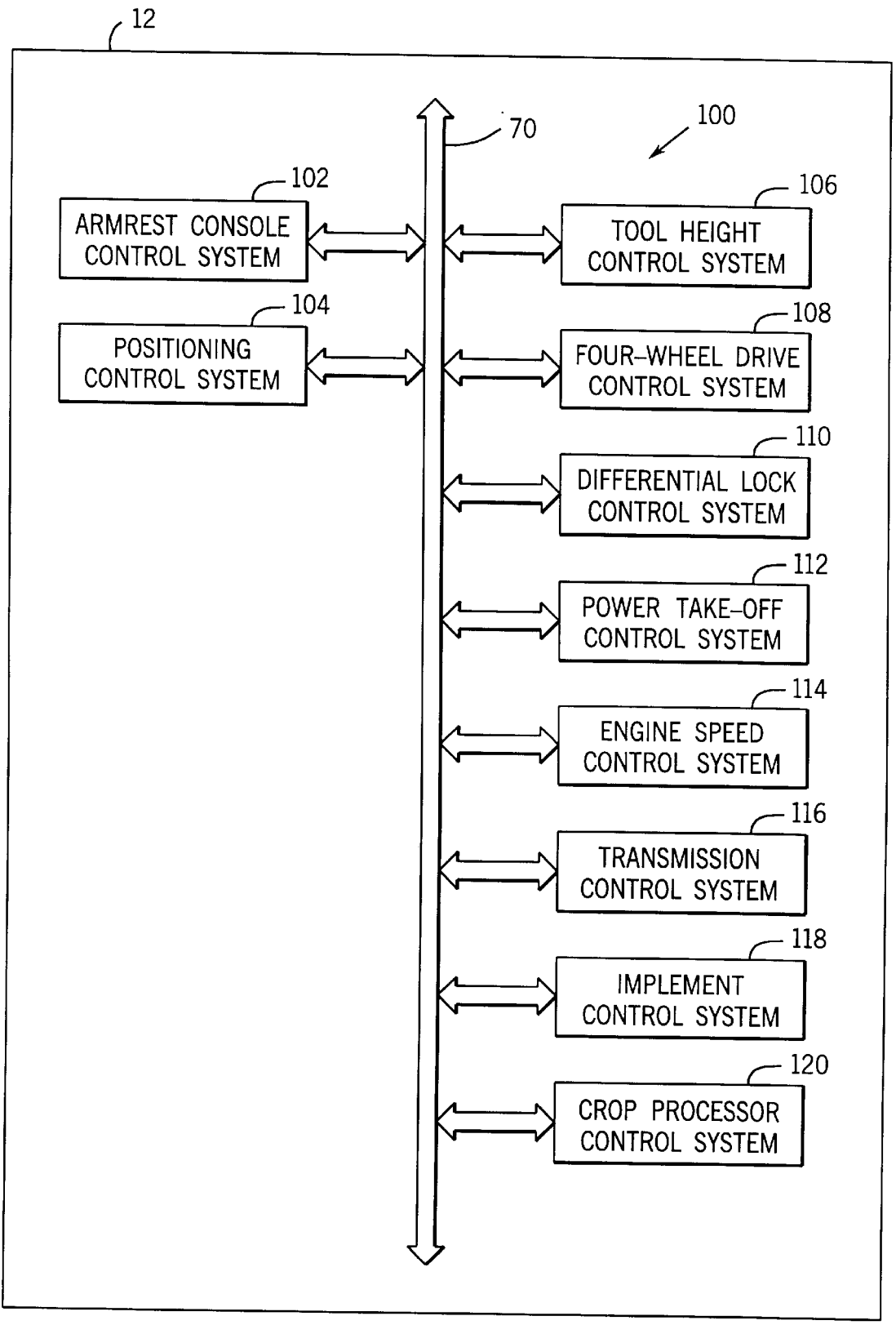
FIG. 3 is a block diagram showing an off-road vehicle equipped with exemplary control systems which communicate with each other across a vehicle data bus.

Referring to FIG. 3, an exemplary control system 100 shows vehicle 12 equipped with control systems which communicate across vehicle data bus 70, which preferably conforms to the SAE J-1939 standard entitled "Recommended Practice for a Serial Control and Communications Vehicle Network". Control system 100 includes an armrest console control system 102, a positioning control system 104, a tool height control system 106, a 4WD control system 108, a DL control system 110, a PTO control system 112, an engine speed control system 114, a transmission control system 116, an implement control system 118 and a crop processor control system 120. Vehicle 12 may be equipped with any or all of these systems (e.g., a tractor may be equipped with implement control system 118 but not crop processor control system 120; vice-versa for a combine). Control system 100 may also include control circuits to perform other functions.

Figure 4:
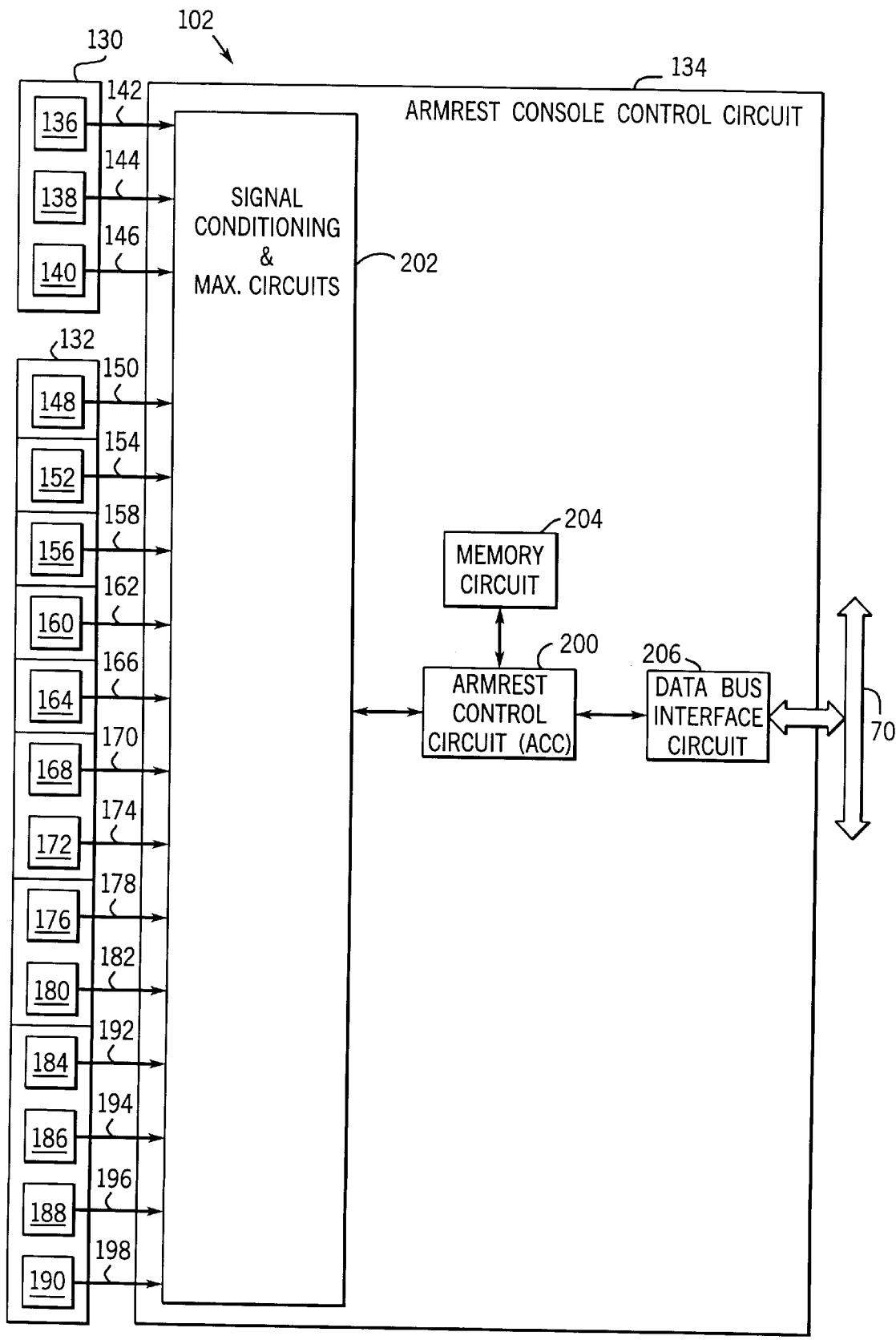
FIG. 4 is a block diagram showing the armrest console control system of FIG. 3 including the sequence devices of FIG. 2, the command devices for the output control systems, an armrest control circuit, and an interface circuit for the vehicle data bus.

Referring to FIG. 4, armrest console control system 102 includes sequence devices 130, command devices 132 for output control systems 106–120, and an armrest console control circuit 134 coupled to bus 70. Armrest console control system 102 is mounted in the vehicle cab, and may include other command devices (not shown) for the control systems of FIG. 3. In this example, however, it is assumed that the command repeater system records sequential actuations of only command devices 132. Also, the various input devices could be located elsewhere than the armrest control console.

Sequence devices 130 include playback, record and erase switches 136–140 configured to generate playback, record and erase signals 142–146, respectively. Command devices 132 include a hitch switch 148 configured to generate RAISE/LOWER signals 150 for tool height control system 106, 4WD switch 152 generating OFF/ON/AUTO signals 154 for 4WD control system 108, DL switch 156 generating OFF/AUTO/MOMENTARY signals 158 for DL control system 110, PTO switch 160 generating ON/OFF signals 162 for PTO control system 112, throttle lever 164 generating speed signals 166 for engine speed control system 114, shift pulse lever 168 and mode select lever 172 generating UPSHIFT/DOWNSHIFT pulses 170 and FA/FM/N/R mode signals 174 for transmission control system 116, implement switch 176 and apply control switch 180 generating RAISE/LOWER signals 178 and apply signals 182 for implement control system 118, and crop processor command devices 184–190 generating rotor, concave, sieve and cleaning fan command signals 192–198 for crop processor control system 120.

Sequence signals 142–146 and command signals 150, 154, 158, 162, 166, 170, 174, 178, 182, 192–198 are read by an armrest control circuit (ACC) 200 through a signal conditioning and multiplexing circuit 202. ACC 200 includes a digital processor coupled to a memory circuit 204 including nonvolatile memory (PROM, EEPROM or FLASH) for programs and volatile memory (RAM) for variables and recorded command sequences. Dedicated, specific purpose equipment or hard-wired logic circuitry can also be used.

ACC 200 controls the sequential command repeater functions of CCC 14 as described in relation to FIG. 1. In particular, in the normal mode, ACC 200 reads command devices 132 and communicates command signals to control systems 106–120 through interface 206 via bus 70. In response to record signal 144, ACC 200 enters record mode wherein it also records sequential actuations of command devices 132, and other command devices in control systems 104–120 received via bus 70, into memory circuit 204. In response to playback signal 142, ACC 200 enters playback mode wherein it transmits the playback active status to control systems 106–120 via bus 70, and communicates a recorded command sequence read from memory circuit 204. In response to erase signal 146, ACC 200 erases a recorded sequence of commands from memory circuit 204. ACC 200 will reject any attempt to enter the playback mode before an erased command sequence is re-recorded.

Figure 5:
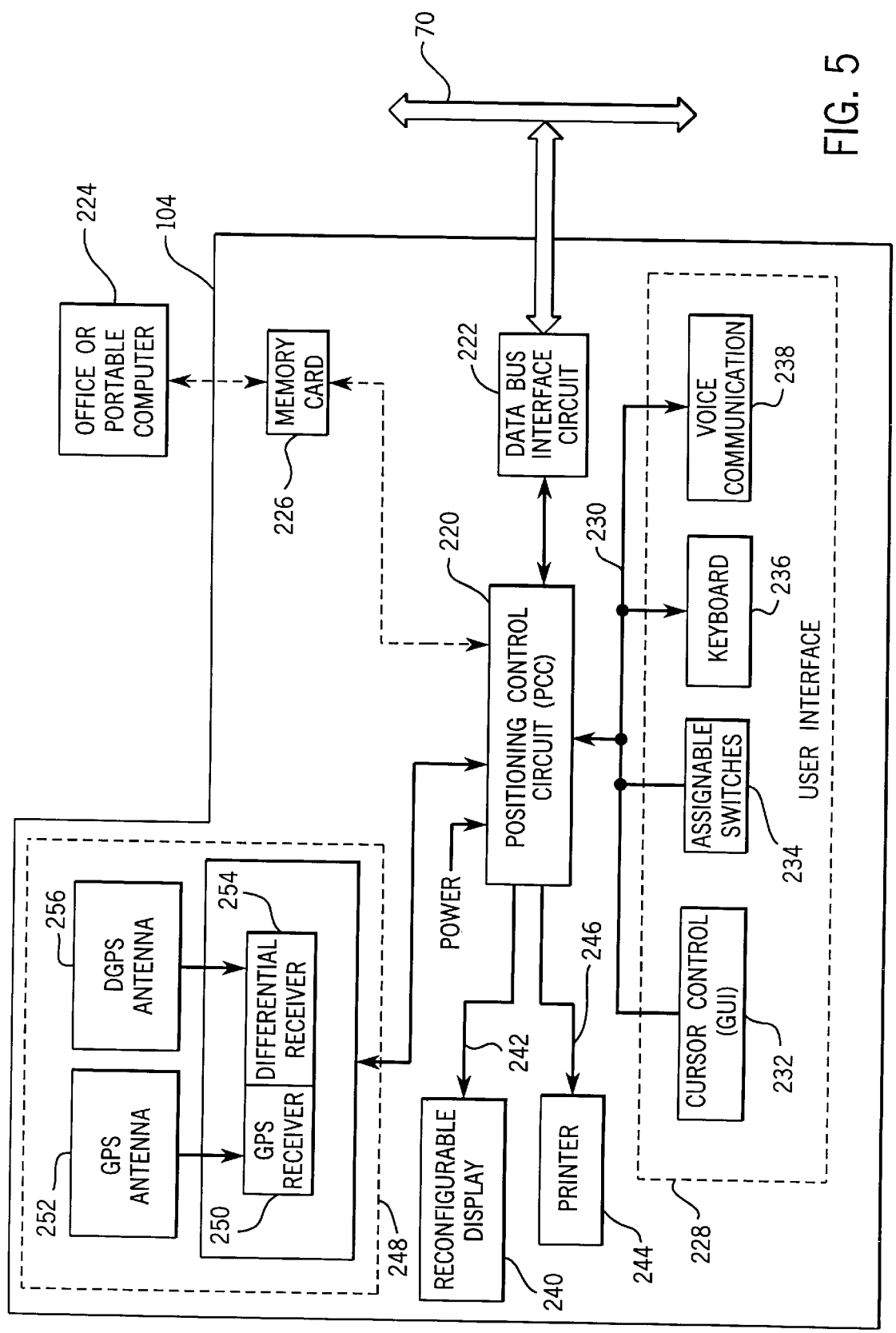
FIG. 5 is a block diagram showing the positioning control system of FIG. 3 including a GPS receiver, a memory card interface, a positioning control circuit, and an interface circuit for the vehicle data bus.

Referring to FIG. 5, positioning control system 104 includes a positioning control circuit (PCC) 220 for receiving, processing and communicating site-specific data. PCC 220 is coupled to an interface circuit 222 for communicating across bus 70. PCC 220 also communicates with external systems such as a computer 224 via a memory card 226 which may be used to transfer geo-referenced maps including spatially-variable map data indicative of field borders or other positions in a field or site. Card 226 can be a Type II PCMCIA card made by Centennial Technologies, Inc. PCC 220 includes a digital processor and memory. However, dedicated, specific purpose equipment or hard-wired logic circuitry can also be used.

PCC 220 communicates with an operator through a user interface 228 via a bus 230 (e.g., RS-232/485 interface). Interface 228 can include, for example, a graphical user interface 232 providing cursor control (e.g., a mouse, joystick or four-way switch with up, down, right and left positions), assignable switches 234 (e.g., push buttons) configurable by PCC 220, a keyboard 236 and a voice interface 238. PCC 220 generates display signals applied to a reconfigurable display 240 (e.g., CRT, flat screen) via a bus 242. Display 240 may include an active-matrix LCD capable of displaying alpha-numeric characters, graphics, and full-motion video in a number of colors under varying ambient light conditions. Display 240 can display, inter alia, the configuration of switches 234. User interface 228 and display 240 are located in the cab for easy operator access. PCC 220 may communicate with a printer 244 via an interface 246 (e.g., an RS-232 link).

PCC 220 also communicates with a location signal generation circuit 248 which generates location signals representing the positions of vehicle 12. Circuit 248 includes a global positioning system (GPS) receiver 250 with an associated antenna 252, and a differential GPS (DGPS) receiver 254 with an associated antenna 256. A single antenna may be used in place of antennas 252 and 256. GPS receiver 250 may be made by Trimble Navigation Ltd. of California, and DGPS receiver 254 may be made by Satloc, Inc. of Arizona. GPS receiver 250 determines longitude and latitude coordinates (and altitude) of the vehicle from signals transmitted by the GPS satellite network. The accuracy of the position data is improved by applying correction signals received by DGPS receiver 254. The DGPS signals are used to correct errors on GPS signals including the selective availability error signal added to GPS signals by the U.S. government. DGPS signals are transmitted by the U.S. Coast Guard and/or commercial services. For example, the Omnistar DGPS system from John E. Chance & Assoc. of Texas includes a network of land-based differential reference stations which send correction signals to a master station for upload to a satellite for broadcast throughout North America. DGPS signals may also be transmitted from a local base station (e.g., top of a building). In one embodiment, PCC 220 interfaces with the SATLOC L-Band Integrated TerraStar DGPS System via an RS-485 link.

In operation, PCC 220 receives the location signals representing the positions of vehicle 12 or an implement coupled thereto. PCC 220 then accesses geo-referenced maps stored in memory card 226 which include map data indicating field borders or other positions. PCC 220 determines distances for vehicle 12 to exit or enter a field by comparing the location signals with the map data, and communicates the distances to ACC 200 via bus 70. In response to the vehicle positions, ACC 200 can record geographic positions as events in a command sequence, can trigger playback, and can playback recorded commands which depend upon recorded geographic positions.

Assignable switches 234 can generate view signals transmitted to ACC 200 via bus 70. In response, ACC 200 transmits a recorded command sequence across bus 70 to PCC 220, which produces a display signal 242 to cause the transmitted command sequence to be displayed on display 240 (in text or graphics). Then, in response to edit signals generated by other switches 234, PCC 220 allows an operator to edit the displayed command sequence. When editing is complete, the revised sequence is transmitted back to ACC 200 via bus 70 and recorded in memory circuit 204. The view and edit signals may also be generated by switches or buttons forming part of sequence devices 130.

Referring to FIG. 6, tool height control system 106 controls the height of a tool 270 raised and lowered by a positioning assembly 272 supported by vehicle 12. System 106 includes a height control circuit (HCC) 274 which receives intermediate control signals from ACC 200 via bus 70. In response, HCC 274 generates raise and lower control signals 276 and 278 applied to raise and lower coils 280 and 282. HCC 274 can include a pulse-width modulated (PWM) interface to generate PWM control signals for the coils. Coils 280 and 282 control a valve assembly 284 to apply pressurized hydraulic fluid from a pump 286 to positioning assembly 272 (e.g., a hydraulic cylinder) via conduit 288. Thus, assembly 272 raises and lowers tool 270 in response to raise and lower control signals 276 and 278. A feedback sensor 290 is coupled to assembly 272 or tool 270 and is configured to generate a feedback signal 292 representing the height of tool 270. HCC 274 uses feedback signal 292 for closed-loop control over the height of tool 270, and transmits signal 292 to ACC 200 for use in the sequencing functions. HCC 274 may also receive other input signals such as draft force and position command signals (not shown) which are also used to set the commanded height of tool 270.

In one embodiment, vehicle 12 is a tractor equipped with a hitch assembly control system and tool 270 is an implement. A hitch assembly control system for a tractor is described in U.S. Pat. No. 5,421,416. However, tool 270 can also include trailing or semi-mounted implements. Vehicle 12 can also be a combine equipped with a header positioning assembly wherein tool 270 is a header. A header control system for a combine is described in U.S. Pat. No. 5,455,769. The '416 and '769 patents are commonly assigned and herein incorporated by reference.

Tool height control system 106 is shown in FIG. 6 as an exemplary output control system. Output control systems 108–120 are generally known. Exemplary 4WD and DL control systems 108 and 110 are described in U.S. Pat. No. 5,505,267. The '267 patent further discloses brake detecting circuits coupled to left and right service brakes of an off-road vehicle such as vehicle 12 and configured to generate signals representing the state of the service brakes. The application of only one of the service brakes indicates that the vehicle is turning. A PTO control system 112 is described in U.S. Pat. No. 5,549,185. An engine speed control system 114 and transmission control system 116 are described in U.S. Pat. No. 5,233,525. These patents are also commonly assigned and incorporated herein by reference.

FIG. 4 shows sequence devices 130 as including three switches. However, a single sequence switch could also be used. In response to actuations of this switch, ACC 200 would generate record, playback and erase signals based upon the time that the single switch is actuated. For example, an actuation of <1 second could indicate a playback request, an actuation between 2 and 4 seconds could indicate a record request, and an actuation of >5 seconds could indicate an erase request.

Figure 7:
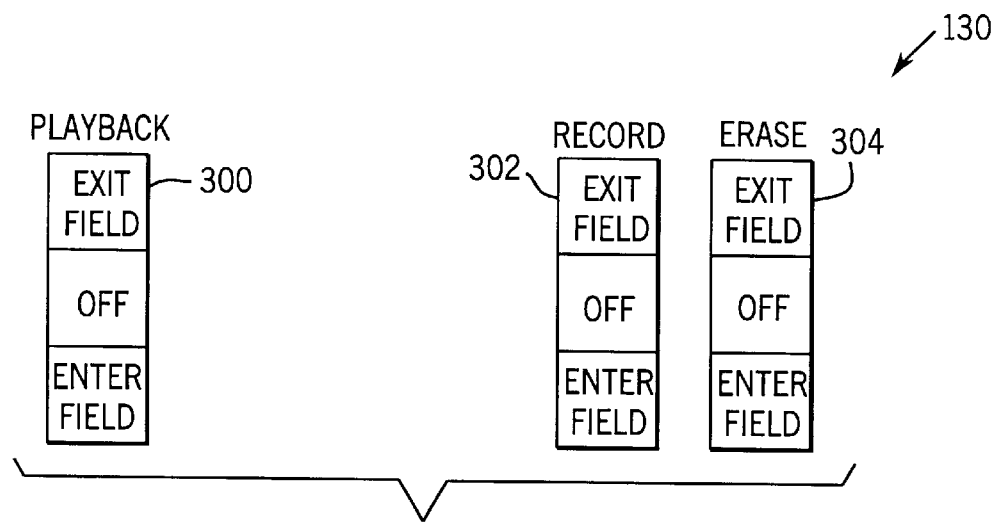
FIG. 7 shows another embodiment of the sequence devices configured to process multiple command sequences.
Figure 8:
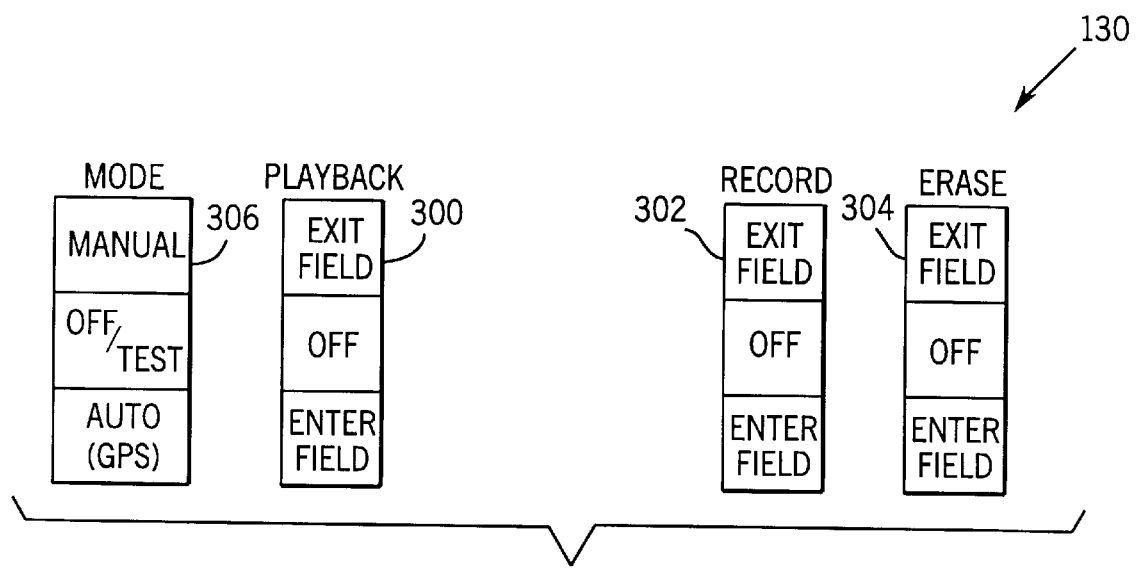
FIG. 8 shows another embodiment of the sequence devices similar to that shown in FIG. 7 which includes a mode switch for selecting between off/test, manual and automatic (e.g., geographic position) modes of operation.

Multiple command sequences can be processed using appropriate sequence devices 130. Referring to FIGS. 7 and 8, sequence devices 130 include playback, record and erase switches 300–304, each having OFF, EXIT FIELD, and ENTER FIELD positions. Switches 300–304 generate signals used by ACC 200 to select an identified command sequence for playback, record, erase, view and edit functions.

Referring specifically to FIG. 8, sequence devices 130 can further include a mode switch 306 read by ACC 200. Mode switch 306 includes OFF or OFF/TEST, MANUAL and AUTO positions which cause ACC 200 to operate in the respective modes. In the OFF mode, ACC 200 disables all sequence functions while in OFF/TEST mode, playback is disabled while other sequence functions (e.g., recording, erasing, viewing or editing) are allowed. In MANUAL mode, ACC 200 allows the playback of a recorded command sequence only in response to manual actuations of playback switch 300, and does not allow automatic data (e.g., geographic positions) to be recorded as triggers or events. In AUTO mode, ACC 200 allows the playback of a recorded sequence in response to an actuation of playback switch 300 or in response to an automatic trigger (e.g., geographic position), and allows the automatic triggers to be recorded. In a system which does not permit automatic triggering, mode switch 306 may not have an AUTO position.

Figure 9:
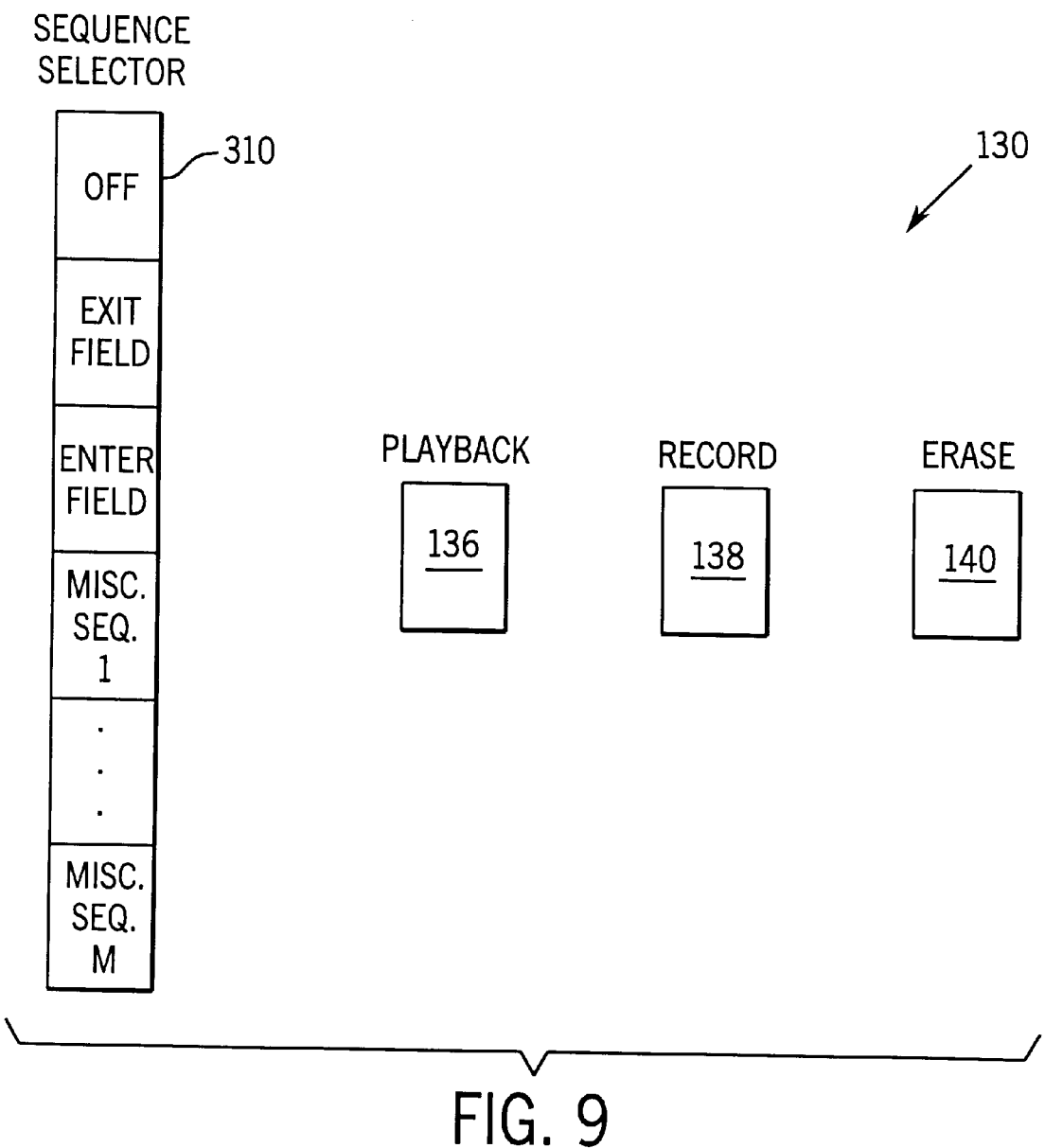
FIG. 9 shows another embodiment of the sequence devices including the PLAYBACK, RECORD and ERASE sequence devices of FIG. 4 which includes a sequence selector switch for selecting one of multiple command sequences.

Referring to FIG. 9, another embodiment includes two-position playback, record and erase switches 136–140 and a sequence selector switch 310 configured to generate sequence select signals representing its OFF, EXIT FIELD, ENTER FIELD and M miscellaneous sequence positions. ACC 200 processes a command sequence selected by the sequence select signals. Sequence selector switch 310 may include a thumbwheel switch. Miscellaneous command sequences are used whenever an operator wants to record and playback a command sequence (e.g., raising and lowering a plow to avoid rocks in a field, digging a hole using a backhoe).

Referring to FIG. 10, the data structure used by ACC 200 to record command sequences is represented by a table including columns labeled SEQUENCE_ID, TRIGGER CONDITION, COMMAND DEVICES, SEQUENCE STEPS, RECORDED EVENT and COMMAND. Although FIG. 10 shows a table, other data structures or data representations may be used to store the command sequence data. Each column of the table is described below.

The SEQUENCE_ID column identifies each command sequence which is selectable by sequence devices 130. In this example, selectable command sequences are EXIT_FIELD and ENTER_FIELD. However, other command sequences may also be defined (e.g., PASS_OVER_ROCK; DIG_HOLE).

The TRIGGER OR PLAYBACK CONDITION column identifies condition(s) which will trigger playback of a recorded command sequence. In the example, assuming sequence devices 130 of FIG. 8 are used, playback of EXIT_FIELD can be triggered by manual actuation of playback switch 300 to the EXIT FIELD position when ACC 200 is in MANUAL or AUTO mode, or can be triggered automatically when vehicle 12 is a predetermined distance (e.g., 30 feet) from exiting a field when ACC 200 is in AUTO mode. The positive GPS number for EXIT_FIELD ("30") indicates that vehicle 12 is in a field and traveling toward the border; the negative GPS number for ENTER_FIELD ("-5") indicates that vehicle 12 is outside the field and traveling toward the border. However, other conventions may also be used to store the direction of travel of vehicle 12.

Other condition(s) may also be defined to trigger automatic playback of a recorded command sequence. For example, EXIT_FIELD and ENTER_FIELD sequences could be automatically triggered by other signals which indicate that vehicle 12 is turning at the headlands of a field. Such other signals include the application of a single brake (sensed using brake input signals as in U.S. Pat. No. 5,505,267), or a sensed steering angle signal which indicates that vehicle 12 is turning at a headland (e.g., an angle exceeding a predetermined value which is greater than the maximum turning angle expected within a field).

The COMMAND DEVICES column includes an entry for each command device 132 for which actuations may be recorded. Because an operator may want to record actuations of certain command devices but not others, COMMAND DEVICES can be edited to allow additions and deletions to a command sequence.

The SEQUENCE STEPS column shows the number of steps in a recorded sequence for each command device 132. For example, the EXIT_FIELD sequence recorded one actuation of hitch switch 148, three actuations of shift pulse lever 168, and zero actuations of mode select lever 172.

The RECORDED EVENT and COMMAND columns include the values of event parameters and commands corresponding to each actuation of command devices 132 which was recorded. RECORDED EVENTs are the values of the parameters which existed when command devices 132 were actuated during recording. During playback, the recorded COMMANDs are commanded when the values of the event parameters equal the values which were recorded. The event parameters include the sequence trigger (TRIGGER), values of a timer started by the trigger (TIMER), values of an implement feedback signal (e.g., IPOS), distances to a field border (GPS), or other signals. The RECORDED EVENT column can be edited to select different event parameters to record and playback. For example, an operator may want to edit the RECORDED EVENT column to allow recording and playback of a command sequence wherein 4WD is disengaged based on GPS position (GPS) instead of implement position (IPOS). The COMMAND column stores the commands executed by ACC 200 in response to actuations of command devices 132 during recording. Either the command signals or the control signals can be recorded in the COMMAND column.

The RECORDED EVENT and COMMAND columns are best described by example. Referring to the first four rows of the EXIT_FIELD sequence, assume ACC 200 detected an actuation of hitch switch 148 to a raise position when a record signal was received, an actuation of 4WD switch 152 to OFF when height feedback signal 192 indicated tool 270 had reached a transport position, an actuation of DL switch 156 to OFF 1 second after the record signal was received, and an actuation of PTO switch 160 to OFF when vehicle 12 reached the field border. ACC 200 recorded the actuations in the first four rows. During playback, ACC 200 uses the table to determine the events at which the recorded commands should be generated: ACC 200 raises the hitch when trigger is received, disengages 4WD when tool 270 reaches transport position, unlocks DL 1 second after triggering and disengages PTO at the border.

Figure 11:
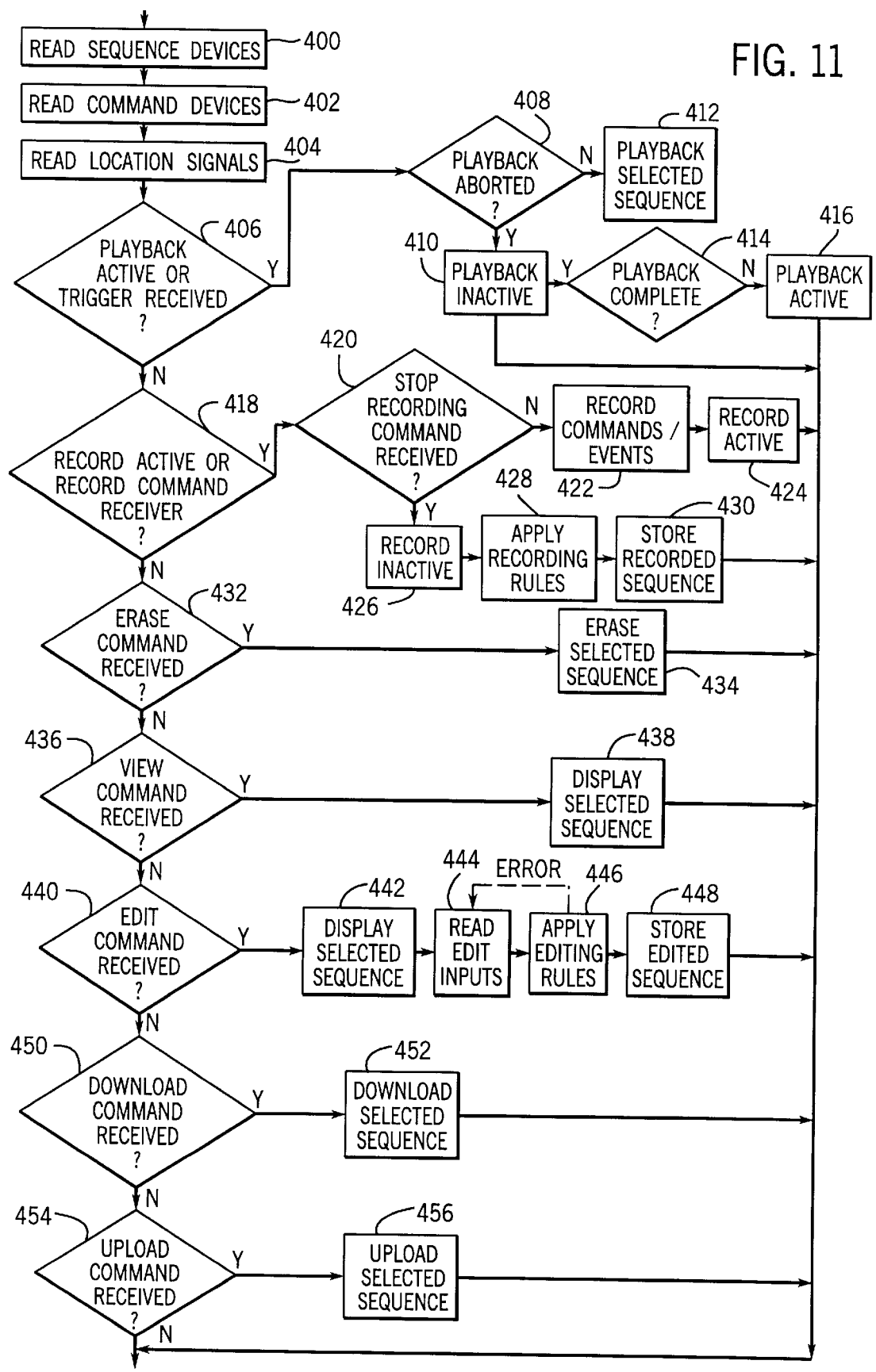
FIG. 11 shows a flow chart which represents steps performed by the command control circuit of FIG. 1.

Referring to FIG. 11, steps performed by ACC 200 are shown. At steps 400–404, ACC 200 reads signals from sequence devices 130, command devices 132 and location signals 30. At step 406, ACC 200 determines whether to enter playback mode. Playback mode is entered when a playback trigger is received or playback mode is active. A playback trigger is received if any TRIGGER CONDITION stored in the data structure of FIG. 10 is true. If playback is active, ACC 200 determines whether playback should be aborted at step 408. Playback mode is aborted, for example, if a selected command sequence has not been stored in memory circuit 204, or if playback switch 136 is actuated before playback completes (i.e., a manual override of playback). In one embodiment, ACC 200 also allows manual override of individual outputs in response to actuation of the command device(s) for that output. If playback was aborted, ACC 200 sets a status flag to indicate that playback is inactive at step 410 and exits. If not aborted, ACC 200 performs playback of the selected command sequence at step 412. ACC 200 determines whether any recorded event in the selected sequence has occurred. For each event which has occurred, ACC 200 executes the recorded command for the respective command device 132. After all recorded events have been tested, ACC 200 determines whether playback is complete at step 414. If so, ACC 200 sets the playback flag to inactive at step 410. If not, ACC 200 sets the playback flag to active at step 416. ACC 200 then exits, and waits for the next control cycle to re-enter the logic at step 400.

At step 418, ACC 200 determines whether to enter record mode. Record mode is entered in response to an actuation of record switch 138. If record is active, ACC 200 determines at step 420 whether a stop record command was received in response to a second actuation of record switch 138. If not, ACC 200 checks for actuations of command devices 132 at step 422 by detecting changes in the respective command signals since the last pass. When an actuation is detected, ACC 200 temporarily records the command and the value of the event parameter. At step 424, ACC 200 sets a record status flag to indicate that record is active. Once record stops, ACC 200 sets the status flag to indicate that record is inactive at step 426. ACC 200 then applies a set of recording rules at step 428 to the command sequence temporarily recorded, and then records the command sequence in memory circuit 60 at step 430. Recording rules prevent the recording of undesirable command sequences which may have an adverse affect during playback. For example, assume an operator commanded engagement of the PTO at the border when the ENTER_FIELD sequence of FIG. 10 was recorded. Further, assume that automatic engagement of the PTO upon entering a field is undesirable. During recording, a rule was applied at step 428 which erased the sequence step of engaging the PTO upon re-entering a field. Thus, ACC 200 did not record a sequence step for engaging the PTO in the ENTER_FIELD sequence. Other recording rules can be used, or step 428 can be deleted if no rules are needed.

At step 432, ACC 200 determines whether an erase command is received. If so, ACC 200 determines which command sequence was selected, and erases the selected sequence at step 434. At step 436, ACC 200 determines whether a view command is received. If so, ACC 200 determines which command sequence was selected, and causes the selected command sequence to be displayed on display 240 at step 438. Sequences can be displayed as text in a table as in FIG. 10, or in graphical form.

At step 440, ACC 200 determines if an edit command is received. If so, ACC 200 determines which command sequence was selected, and causes the selected sequence to be displayed on display 240 at step 442. At step 444, ACC 200 reads edit signals and edits a temporary copy of the selected sequence. During editing, ACC 200 applies a set of editing rules to the temporary copy at step 446. Editing rules 446 may be the same or different than rules 428. More editing rules 446 may be needed since manual editing can cause more undesirable command sequences to be input than during record mode. This occurs because, during editing, an operator manipulates numerical values within the command sequence data structure, and is not actually operating vehicle 12. Thus, for example, the editing rules could prevent an operator from changing the commands to values which cannot possibly occur, or which could damage hardware (e.g., shifting from first to ninth gear in one step). In one embodiment, the editing rules allow an operator to make only small adjustments to the recorded command sequence by requiring edited values to be within a range of the recorded values. If an error is found in the edited values, ACC 200 loops back to step 444 to give the operator a chance to fix the error. As described above, an operator can also edit the command devices within a sequence, or edit the event parameters. Once an edited sequence is acceptable, ACC 200 stores the sequence in memory circuit 204 at step 448 and exits.

Assignable switches 234 can also be configured to generate download and upload signals transmitted to ACC 200 via bus 70. At step 450, ACC 200 determines if a download command was received. If so, ACC 200 downloads a predetermined command sequence at step 452 through an interface (e.g., card 226, PCC 220 and bus 70) and stores the downloaded sequence in memory circuit 204. The data structure of FIG. 10 can again be used to download the sequence. A set of rules can be applied which is similar to rules 428 and 446, and the sequence can be displayed to an operator with an acknowledgement (e.g., switch actuation) required before the command sequence can be repeated (steps not shown). Then, during playback, ACC 200 can playback the downloaded sequence in the same manner as any other sequence. At step 454, ACC 200 determines if an upload command was received. If so, ACC uploads the selected command sequence at step 456 to an external device through an interface (e.g., card 226).

Thus, the sequential command repeater system can playback command sequences recorded by an operator or downloaded via an interface. The predetermined command sequences may have been recorded previously (e.g., the last time particular operations were being performed), or may be predetermined by a dealer or manufacturer. For example, an implement manufacturer could predetermine a set of command sequences which provide expert control for commonly repeated command sequences of an implement, and provide the command sequences with the implement. Thus, even inexperienced operators can execute complex command sequences using simple manual actuations, or even have sequences triggered automatically based upon positions.

Referring to FIG. 12, operation of control system 10 is summarized in relation to a map of an agricultural field 500 including markers 502 and 504 representing the position of a tractor and planter, respectively, and an arrow 506 representing an expected course of travel (determined using a vector from a past to the current position, or using signals from a compass). The tractor is 30 feet from the field border, and exiting field 500. After actuating a record switch, an operator performs the following command device actuations before re-actuating the record switch to stop recording: raised the hitch simultaneously with actuating the record switch; disengaged 4WD when the hitch reached transport position; unlocked DL 1 second after actuating the record switch; disengaged PTO at the border; lowered a throttle setting from 90% at one hitch position (X) to 60% when the hitch reached the transport position; up-shifted a transmission to 5th, 6th and 7th gear two, three and four seconds after actuating record switch, raised implement 1 when the tractor was 10 feet past the border (at which time implement 1 was at the border), stopped applying a farming input using implement 1 when the tractor was 5 feet past the border, and similarly controlled a second implement. The events and commands were recorded in the data structure of FIG. 10. The next time the tractor is 30 feet from the border and about to exit the field, an actuation of a playback switch will repeat the command sequence. Or, if ACC 200 is in AUTO mode, the sequence will automatically execute based upon the GPS trigger.

While the embodiments illustrated in the FIGURES and described above are presently preferred, it should be understood that these embodiments are offered by way of example only. For example, the selected embodiment can implement a subset of the functions described herein to include systems having no positioning signals, only one command sequence, no view, edit, download or upload sequence functions). The invention is not intended to be limited to any particular embodiment, but is intended to extend to various modifications that nevertheless fall within the scope of the appended claims.

What is claimed is:

1. A control system for controlling a plurality of outputs associated with an off-road vehicle by recording at least one sequence of commands in response to a record signal and repeating the recorded sequence of commands in response to a playback signal, the outputs being actuated by respective actuators in response to respective control signals, the control system comprising:

a plurality of operator-actuatable command devices configured to generate command signals;

a memory circuit; and a control circuit coupled to the actuators, the command devices, and the memory circuit, the control circuit configured to operate in a normal mode wherein the control signals applied to the actuators are generated based upon the command signals, to operate in a record mode in response to the record signal wherein the sequence of commands is recorded in the memory circuit in response to sequential actuations of the command devices, and to operate in a playback mode in response to the playback signal wherein the control signals are generated based upon the recorded sequence of commands.

2. The control system of claim 1 wherein at least one of the outputs is selected from the group consisting of a four-wheel drive (4WD) output device, a differential lock (DL) output device and a power take-off (PTO) output device, and wherein at least one of the command devices is selected from the group consisting of a 4WD command device, a DL command device, and a PTO command device.

3. The control system of claim 2 wherein the vehicle is an agricultural tractor and the outputs include at least one agricultural implement, and one of the command devices is configured to generate command signals for raising and lowering the implement.

4. The control system of claim 3 wherein the implement is configured to apply a farming input to a field, and another one of the command devices generates command signals for applying the farming input.

5. The control system of claim 1 wherein the outputs include a four-wheel drive (4WD) output device, a differential lock (DL) output device, and a power takeoff (PTO) output device, and wherein the command devices include a 4WD command device, a DL command device, and a PTO command device.

6. The control system of claim 5 wherein the outputs further include an engine speed actuator and a transmission, and the command devices further include a speed command device and a transmission command device.

7. The control system of claim 1 wherein the vehicle is an agricultural harvesting vehicle and the outputs include at least one crop processor, and one of the command devices is configured to generate command signals for the crop processor.

8. The control system of claim 7 wherein the outputs include at least two crop processors selected from the group consisting of a header, a rotor, a concave, a sieve, and a cleaning fan, and the command devices are configured to generate command signals for the selected crop processors.

9. The control system of claim 1 wherein the vehicle is a construction equipment vehicle and the outputs include at least one construction device, and one of the command devices is configured to generate command signals for the construction device.

10. The control system of claim 9 wherein the at least one construction device is selected from the group consisting of a boom, an arm, a bucket and an auger, and the command devices are configured to generate command signals for the selected construction device.

11. The control system of claim 1 wherein, in the record mode, the control signals are also generated based upon the command signals.

12. The control system of claim 1 wherein the recorded sequence of commands can include a plurality of commands corresponding to a single one of the outputs.

13. The control system of claim 1 wherein the recorded sequence of commands includes a plurality of pairs of recorded events and recorded commands and, in the playback mode, the control signals are generated based upon the recorded commands in response to the occurrence of the recorded events.

14. The control system of claim 13 wherein the control circuit is configured to start a timer in response to the record signal and the playback signal, and the recorded events can depend upon the timer value.

15. The control system of claim 13 further comprising a sense circuit coupled to the control circuit and configured to generate a feedback signal, wherein the recorded events can depend upon the feedback signal.

16. The control system of claim 13 further comprising a location signal generation circuit coupled to the control circuit and configured to receive positioning signals and to generate location signals therefrom, wherein the recorded events can depend upon the location signals.

17. The control system of claim 1 further comprising at least one operator-actuatable sequence device coupled to the control circuit and configured to generate the record and playback signals.

18. The control system of claim 17 wherein the at least one sequence device includes a record switch and a playback switch configured to generate the record signal and the playback signal, respectively.

19. The control system of claim 18 wherein the record and the playback switches include first and second positions corresponding to first and second command sequences, respectively, and the control circuit is configured to record and to playback the first and the second command sequences depending upon the positions of the record switch and the playback switch, respectively.

20. The control system of claim 1 further comprising a sequence selector command device coupled to the control circuit and configured to generate sequence select signals, wherein the control circuit is configured to record and playback a plurality of command sequences selected by the sequence select signals.

21. The control system of claim 17 wherein the at least one sequence device is further configured to generate an erase signal, and the control circuit is further configured to erase the recorded command sequence in response to the erase signal.

22. The control system of claim 17 further comprising an electronic display coupled to the control circuit, wherein the at least one sequence device is further configured to generate a view signal, and the control circuit is further configured to produce a display signal in response to the view signal which, when applied to the display, generates visible indicia showing the recorded command sequence.

23. The control system of claim 17 wherein the at least one sequence device is further configured to generate editing signals, and the control circuit is further configured to edit the recorded command sequence in response to the editing signals.

24. The control system of claim 23 wherein a set of editing rules is applied to the command sequence being edited to eliminate undesirable command sequences.

25. The control system of claim 1 further comprising a location signal generation circuit coupled to the control circuit and configured to receive positioning signals and to generate location signals therefrom, wherein the playback signal is generated by the control circuit based upon the location signals.

26. The control system of claim 25 wherein the memory circuit is configured to store a geo-referenced map including spatially-variable map data indicative of predetermined geographic positions, and the playback signal is generated based upon a relationship between the location signals and the geographic positions.

27. The control system of claim 26 wherein the relationship between the location signals and geographic positions is stored in the recorded command sequence.

28. The control system of claim 26 wherein the predetermined geographic positions correspond to the borders of a field.

29. The control system of claim 1 further comprising left and right brake detecting circuits coupled to left and right service brakes of the vehicle and to the control circuit, the brake detecting circuits configured to generate signals representing the state of the service brakes, wherein the control circuit generates the playback signal based upon the state of the brakes.

30. The control system of claim 1 wherein the control circuit generates the playback signal based upon a steering angle signal.

31. The control system of claim 1 wherein a set of recording rules is applied to the command sequence being recorded to eliminate undesirable command sequences.

32. The control system of claim 1 further comprising a sequence interface configured to receive a predetermined sequence of commands from an external device, wherein the control circuit is further configured to download the predetermined sequence of commands.

33. The control system of claim 32 wherein the control circuit is further configured to upload a recorded sequence of commands to the external device.

34. A control system for controlling a plurality of outputs associated with an off-road vehicle by recording at least one sequence of commands in response to a record signal and repeating the recorded sequence of commands in response to a playback signal, the outputs being actuated by respective actuator means in response to respective control signals, the control system comprising:

means for generating command signals;

memory means;

means for selecting between a record mode, a normal mode and a playback mode in response to the record and playback signals;

means for recording the sequence of commands in the memory means in response to sequential command signals when the record mode is selected;

means for generating the control signals based upon the command signals when the normal mode is selected and based upon the recorded sequence of commands when the playback mode is selected; and means for applying the control signals to the actuator means.

35. The control system of claim 34 further comprising means for generating location signals representing the current position of the off-road vehicle, and means for generating the playback signal based upon the location signals.

36. The control system of claim 35 wherein the recorded sequence of commands includes a plurality of pairs of recorded events and recorded commands and, in the playback mode, the control signals are generated based upon the recorded commands in response to the occurrence of the recorded events, and wherein the recorded events can depend upon the location signals.

37. A method of controlling a plurality of outputs associated with an off-road vehicle, the outputs actuated by respective actuators in response to respective control signals normally generated in response to actuations of a plurality of command devices, comprising the steps of:

generating a record signal;

in response to the record signal, recording a sequence of commands in a memory circuit in response to sequential actuations of the command devices;

after the command sequence has been recorded, generating a playback signal; and in response to the playback signal, repeating the sequence of commands by generating control signals based upon the recorded sequence of commands.

38. The method of claim 37 wherein the vehicle is an agricultural tractor and the outputs include a four-wheel drive (4WD) output device, a differential lock (DL) output device, a power take-off (PTO) output device, and at least one implement, and the command devices include a 4WD command device, a DL command device, a PTO command device, and another command device configured to generate command signals for raising and lowering the implement.

39. The method of claim 37 wherein the vehicle is a combine and the outputs include at least two crop processors selected from the group consisting of a header, a rotor, a concave, a sieve, and a cleaning fan, and the command devices are configured to generate command signals for the selected crop processors.

40. The method of claim 37 further comprising the step of generating the playback signal using location signals representing the position of the vehicle.

41. The method of claim 40 wherein the recorded sequence of commands includes a plurality of pairs of recorded events and recorded commands and, in response to the playback signal, the control signals are generated based upon the recorded commands in response to the occurrence of the recorded events, and wherein the recorded events can depend upon the location signals.

42. A control system for controlling a plurality of outputs associated with an off-road vehicle by playback of at least one predetermined sequence of commands in response to a playback signal, the outputs being actuated by respective actuators in response to respective control signals, the control system comprising:

a plurality of operator-actuatable command devices configured to generate command signals;

a sequence interface configured to receive the at least one predetermined sequence of commands; and a control circuit coupled to the actuators, the command devices, and the sequence interface, the control circuit being configured to download the at least one predetermined sequence of commands from the sequence interface, and further configured to operate in a normal mode wherein the control signals applied to the actuators are generated based upon the command signals, and to operate in a playback mode in response to the playback signal wherein the control signals are generated based upon the predetermined sequence of commands.

43. The control system of claim 42 further comprising a location signal generation circuit coupled to the control circuit and configured to receive positioning signals and to generate location signals therefrom, wherein the playback signal is generated by the control circuit based upon the location signals.

* * * * *